United States Patent [19]

McLaren et al.

[11] Patent Number: 4,869,621

[45] Date of Patent: Sep. 26, 1989

[54] METHOD OF SEALING PERMEABLE EARTH SURFACE OR SUBSURFACE MATERIALS HAVING ALKALINE CONDITIONS BY INDUCED PRECIPITATION OF CARBONATES

[75] Inventors: Eugene H. McLaren, Poestenkill; George W. Putman, Schenectady; James R. Young, Cazenovia, all of N.Y.

[73] Assignee: Terran Research, Inc., Cazenovia, N.Y.

[21] Appl. No.: 202,416

[22] Filed: Jun. 6, 1988

[51] Int. Cl.$^4$ ................................................ E02D 3/12
[52] U.S. Cl. .................................... 405/263; 405/264
[58] Field of Search ............... 405/263, 264, 266, 267; 106/109, 118, 286.6

[56] References Cited

U.S. PATENT DOCUMENTS

| | | | |
|---|---|---|---|
| 3,793,841 | 2/1974 | Dozsa | 405/263 |
| 3,876,439 | 4/1975 | Schneider | 405/263 X |
| 4,136,998 | 1/1979 | Bassier et al. | 405/267 |
| 4,233,015 | 11/1980 | Teague et al. | 405/263 |

Primary Examiner—David H. Corbin
Attorney, Agent, or Firm—Charles S. McGuire

[57] ABSTRACT

A method of artificially sealing cracks, fissures or other voids in earth strata under alkaline conditions, or in alkaline structural materials. Sealing is effected by induced precipitation of calcium carbonate, usually in the form of calcite, either in alkaline rocks, in other rocks where alkaline groundwaters are present, or in structures of alkaline materials such as cement or marble. A number of examples are discussed for effecting the desired precipitation including application of aqueous solutions which affect either calcium or carbonate ion concentration, increasing pH by degassing of carbonated water and application of slurries of less stable forms of calcium carbonate (aragonite and vaterite) to result in precipitation of the more stable form (calcite).

22 Claims, No Drawings

METHOD OF SEALING PERMEABLE EARTH SURFACE OR SUBSURFACE MATERIALS HAVING ALKALINE CONDITIONS BY INDUCED PRECIPITATION OF CARBONATES

BACKGROUND OF THE INVENTION

The present invention relates to novel methods of sealing alkaline areas of the earth at or beneath the surface, and more particularly to methods of inducing precipitation of carbonates as a means of confining or preventing entry of contaminants, pollutants, sewage or other undesirable leachate waters into groundwaters or aquifers.

Natural subsurface cementation of porous and permeable media below the water table is a well known phenomenon and is one of the key factors in the lithification of sediments, i.e., the filing of small-scale void or pore space between constituent particles or grains by material precipitated or crystallized from solution, or filling of void space (veins, vugs, breccia zones, etc.) in various rocks. Under alkaline conditions (pH > 7.5), the most common natural cements by far are calcium or calcium/magnesium carbonates (mainly as calcite—$CaCO_3$). These natural carbonate cements occur by chemical precipitation or growth from the pore water solution over time and reflect a physiochemical equilibration between mineral constituents of the sediment or bedrock and pore waters, connate waters, or ambient groundwaters.

Deposition of calcium carbonate occurring in nature is a function of temperature, pH, $P_{CO_2}$, and dissolved calcium concentration, and may be influenced by other constituents in solution. The solubility product ($K_{sp}$) of calcite is expressed as a function of calcium and carbonate ion activity ($a_{Ca^{++}} \times a_{CO_3^=} = K_{sp}$). The actual value of the solubility product is somewhat temperature dependent, and the carbonate ion ($CO_3^=$) concentration is pH and $P_{CO_2}$ dependent via the two-stage ionization of carbonic acid to bicarbonate and carbonate ions, viz:

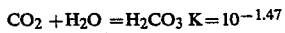
$$CO_2 + H_2O = H_2CO_3 \quad K = 10^{-1.47} \quad @25° C.$$

$$H_2CO_3 = H^+ + HCO_3^- \quad K = 10^{-6.35}$$

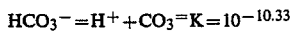
$$HCO_3^- = H^+ + CO_3^= \quad K = 10^{-10.33}$$

It is a principal object of the present invention to provide a method of sealing surface or subsurface alkaline areas of the earth in a uniformly effective and economical manner.

Another object is to provide a method of sealing cracks, fissures or voids in preselected areas having alkaline conditions utilizing materials having long-term compatibility with host materials.

A further object is to provide novel methods of inducing carbonate precipitation, i.e., growth of a chemical sealant, for permeable zones in alkaline media (bedrock or soils) such as limestone or dolomite.

Still another object is to provide a method of sealing permeable, alkaline areas in a manner providing wider potential dispersion via transport of chemical sealants in aqueous suspensions or solution along groundwater or soil waterflow paths.

A still further object is to provide an improved method of sealing fractures in cement or other alkaline materials, such as marble (metamorphized limestone); in this aspect the invention is useful in repairing cracks in dams or other structures, including cement used to plug natural gas wells, and in marble structures.

Other objects will in part be obvious and will in part appear hereinafter.

SUMMARY OF THE INVENTION

The invention involves novel methods of artificially inducing carbonate cementation or, more specifically, precipitation of calcite, as a sealant in soils, sediments and bedrock. The methodology is subject to certain requirements in order to insure a stable seal, as well as to certain site-specific conditions, as discussed in the following detailed description.

Artificially induced carbonate cementation as a sealant should meet the following requirements or restrictions for use:

(a) The carbonate precipitate must be stable, i.e. compatible with the ambient hydrochemistry of groundwaters and aquifer or host material mineralogy including waste site leachates, if present, so as not to be susceptible to subsequent breaching by dissolution. Realistically, the system should sustain a pH of 7.5 or greater.

(b) Added chemical components dispersed after formation of the carbonate precipitate, or during subsequent maintenance or stabilization, must not ultimately enter or reach an aquifer in such quantity as to be unacceptable in terms of water quality.

(c) Net groundwater or recharge water flow-through rates in the area or zone of desired sealing must be compatible with relatively uniform spatial carbonate precipitation. Effective sealing will not occur in zones or paths of high water flow rates due to excessive dilution and potential problems in the nucleation of precipitates and growth rates. Such high flow paths must be first sealed via conventional technologies, e.g. by injections of grout. Precise flow rate limits cannot be specified to meet all potential applications; however, an overall limiting bulk hydraulic conductivity of $K = 10^{-1}$ (vertical or horizontal) should be adequate control as a general rule.

(d) Induced precipitation sealing by the manner of this invention requires adequate time commensurate with the hydraulic conductivity and void or pore space distribution in the subsurface ground to be sealed, the desired dimension of the sealed zone in the direction of the hydraulic gradient and should allow for the possibility that two-stage solution injections may have to be repeated. Induced precipitation must also allow time for overgrowth crystallization, or recrystallization of initially precipitated unstable calcium carbonate phases (such as vaterite or aragonite) on pore or fracture surfaces.

If the calcite solubility product is exceeded by the ion activity product of recharge water or groundwater entering the aquifer, then precipitation analogous to natural cementation will be induced in this area, or zone, and a chemical sealing of permeability will occur. This effect can be produced in several ways, e.g. by increasing pH, by increasing Ca ion concentration, by increasing bicarbonate ion concentration or alkalinity, by degassing $CO_2$, or by use of unstable forms of calcium carbonate, as described below.

The rate of precipitation, however, is a function of mass ion flux ($Ca^{++}$ and $CO_3^=$) at the site, and thus can be controlled by direct additions of appropriate constituents into groundwater at desired locations. These additions may be as simple as surface applications of appropriate materials for subsequent leaching into groundwater, or more controlled via well injection of solutions, depending on initial site conditions, environmental considerations and the desired rate at which the sealing process takes place.

The invention is described in a number of aspects, each directed to different natural conditions which are present at the side where sealing is to take place.

DETAILED DESCRIPTION

Broadly speaking, the invention involves the addition of certain chemicals in controlled amounts to a preselected area or zone in order to induce calcite precipitation in a subsurface, alkaline aquifer, or other layer where alkaline conditions are present, analogous to natural cementation. The manner of application of the chemicals is largely a matter of how quickly the sealing effects are desired. If sealing is to take place in the shortest time possible, the chemicals may be introduced in a solution or slurry pumped directly into the aquifier, or other desired zone of sealing, through injection wells provided for such purpose. When maximum speed is not essential, the chemicals may be deposited in water solution upon the surface and allowed to flow downwardly in the manner of recharge water to the stratum to be sealed. If an even slower rate is permissible, the chemicals may be deposited on the surface in dry form and carried to the aquifer by rain or other natural recharge water. Where the invention is employed to seal fractures or other voids in alkaline materials other than subsurface aquifers, e.g., dams or other cement or marble structures, the chemicals normally are applied in water solution directly to the affected area.

In a first aspect of the invention, chemical components are introduced into the layer of material to be sealed, such as a limestone or dolomite aquifier, or groundwaters already present therein, to directly augment dissolved calcium and/or carbonate ion contents in solution, thereby inducing calcite precipitation.

In addition to ion balance, the pH of existing groundwaters is also determined. Suitable components may then be added, where necessary, to increase pH and shift dissolved carbon into carbonate ion rather than bicarbonate ion or carbonic acid (aqueous carbon dioxide solution). Thus, in a second aspect of the invention, calcite precipitation is induced by controlled increase of pH in the aquifer.

Where carbonated waters or a source of carbon dioxide to effect such carbonation is available at the site, calcite precipitation may be induced in a third manner, i.e., addition of $CO_2$ or carbonic acid to waters leaching carbonate rocks plus added calcium and bicarbonate ion to attain increased calcium and bicarbonate ion contents to reach calcite saturation followed by degassing of $CO_2$ with consequent rise of pH and precipitation of calcium carbonate.

In yet another aspect, the method of the invention is implemented by injecting a slurry of unstable solid calcium carbonate (aragonite or vaterite) into the fissured rock to deposit a fine silt of the unstable material. The aragonite/vaterite recrystallizes to calcite, with attachment to the existing calcite in the fissure walls and with an increase of about 10% in volume of the solid recrystallized, ensuring a solid, attached plug of calcite.

Specific examples of each of the foregoing aspects of the invention will now be discussed. In each case, it will be remembered, a suitable site having the necessary alkaline conditions (either alkaline materials or equivalent alkaline waters) is first selected and the area or zone in which sealing is to take place is identified. Samples of groundwater in the area are then analyzed by conventional techniques to establish the following parameters:

(a) pH
(b) sulfate
(c) total dissolved solids
(d) chloride
(e) bicarbonate
(f) calcium
(g) iron
(h) magnesium
(i) sodium It is also desirable to make at least a rough approximation of the volume of the fissures or voids which must be filled in order to effect the desired sealing. Since the chemicals involved are quite inexpensive, it is not necessary to control the amounts applied with any precision as long as the quantity is at least sufficient to effect the desired sealing.

EXAMPLE I

When ambient groundwater calcium carbonate has a relative concentration of $Ca^{++} \geq HCO_3^-$ (mol equivalents) and a ph between about 7.3 and 9.0, calcite precipitation may be induced by applying $NaHCO_3$, $2(NH_4)CO_3$, or $NaHCO_3 + Na_2CO_3$ via surface application or well injection of 1 molar or more concentration solutions.

Calcite precipitation will occur near or at the water table, or in the zone of mixing of groundwater and the applied solution. A typical schematic reaction for this case is:

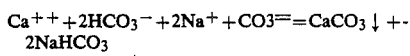

(in solution) or, where a net increase of pH occurs:

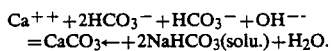

Sodium bicarbonate or a mixture of alkali bicarbonates which limit $Na^+$ ion increase may also be applied during the sealing period, if desired, to buffer the pH increase in groundwaters exiting the area to a value of 8.5 to 9.

EXAMPLE II

Where groundwater analysis shows carbonate ion concentration to exceed calcium ($HCO_3^- > Ca^{++}$), calcite precipitation may be induced by applying $CaSO_4$ or $CaCl_2$ in solutions of 1 molar or more concentration either at the surface or through injection wells.

This procedure may require obtaining a permit from the appropriate environmental agency to allow the temporary increase in sulfate or chloride levels in groundwater. Calcium hydroxide may also be applied to increase pH, and at periodic intervals to maintain the seal as, for example, by the leaching of cement dust admixed with recharge water at the ground surface. A schematic reaction for this example would be:

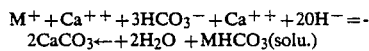

EXAMPLE III

Another aspect of the invention, useful in a wide variety of conditions, involves precipitation of calcite in situ by use of crystalline forms of calcium carbonate which differ in stability and solubility. In addition to calcite, the rhombohedral form of calcium carbonate, a less stable, orthorhombic form known as aragonite is well known and characterized. A third, even less stable and not so well characterized, hexagonal form called vaterite has also been identified. Solubility of these forms is inverse to the order of stability, i.e., vaterite is the most soluble and calcite the least. Thus, when two of these solid forms are in contact with the same solution, the more soluble one dissolves, supersaturating the solution with respect to the other. The dissolved form subsequently precipitates in the more stable phase or form, ultimately resulting in the recrystallization of all the carbonate as calcite.

A typical operation employing this method would first involve estimating or calculating from known site conditions; the volume of cracks, fissures or other voids to be filled by calcite precipitation in order to achieve the desired sealing effect. A supply of aragonite/vaterite slurry is then prepared in sufficient quantity to fill the volume of the voids. This can be easily done in a small laboratory operation or even on site, by the precipitation of $CaCO_3$ from a warm solution of $CaCl_2$ by addition of $Na_2CO_3$. If not used directly, filtration and drying enables preservation of the aragonite/vaterite for as long a period as desired. Some adjustment of the size of the individual crystals in the material precipitated from the slurry is possible, by adjusting concentration and rates of mixing of the components, to obtain a slurry compatible with size of the crack to be sealed.

At the site, the slurry to be injected is obtained by mixing the solid aragonite powder with straight groundwater, or water to which has been added small amounts of $CO_2/Ca(OH)_2$ to adjust the pH and recrystallization rate, and small quantities of other inorganic ions (e.g. $Mg^{+2}$, $Fe^{+2}$) or organic materials (e.g. chelating agents) to give additional controls on the recrystallization rates. Another option is to carbonate the slurry/solution to one atm. carbon dioxide pressure and allow a brief period for dissolved calcium and bicarbonate ion to increase prior to injection or introduction. Following introduction, carbon dioxide will degas from the slurry, raising pH, and additional calcium carbonate will be precipitated, thereby promoting the in-situ recrystallization to calcite. After an appropriate time (normally a few days), the permeability is tested, and a second application made, if necessary.

In the event of too slow a recrystallization resulting from subsurface chemical conditions not initially chemically detected, a second injection can be made, either with solution only, or with additional ragonite slurry, to hasten the recrystallization. For example, in groundwater from a limestone aquifer at 10° C. and pH of 8.2, which are typical conditions, calcite saturation is reached with a bicarbonate ($HCO_3^-$) ion concentration of approximately 100 mg/l and calcium ion concentration of about 75 mg/l. This is equivalent to $1.9 \times 10^{-3}$ molar calcium and $1.6 \times 10^{-3}$ molar bicarbonate in solution, and the $P_{CO_2}$ is <0.01 atm. At one atm. $P_{CO_2}$ the calcium ion in an actual analysis was 390 mg/l and bicarbonate about 1450 mg/l, and thus with loss of carbon dioxide an approximate ten-fold precipitation bulk is obtained relative to groundwater alone.

EXAMPLE IV

The invention may be practiced in yet another aspect involving precipitation of calcium carbonate from an aqueous solution by release therefrom of $CO_2$. A quantity of water with appropriate calcium content is carbonated by adding either carbon dioxide or carbonic acid by conventional techniques. The solution is then injected into a subsurface area where atmospheric pressure is such that the gas will esolve from the solution, thereby raising the pH to a level at which calcium carbonate is precipitated and deposited in any voids in the stratum until the latter is substantially hydraulically sealed. The solution may be applied above the water table, relying solely on the chemical characteristics of the solution to effect the desired precipitation, or below the water table where the carbonated solution mixes with natural groundwaters before degassing takes place.

What is claimed is:

1. A method of artificially inducing carbonate cementation to create an essentially hydraulically sealed stratum extending laterally over a preselected area having pre-existing voids and naturally alkaline conditions, said method comprising ; chemically determining the nature and extent of said naturally alkaline conditions and thereafter contacting said area with an aqueous solution which, when combined with said naturally alkaline conditions, produces a precipitate of in-situ crystalized calcium carbonate in sufficient quantity to essentially fill substantially all of said preexisting voids in said area, thereby hydraulically sealing said stratum.

2. The method of artificially creating a sealed stratum according to claim 1 wherein said stratum comprises a preselected portion of a cement structure.

3. The method of artificially creating a sealed stratum according to claim 1 wherein said stratum comprises a preselected portion of a marble structure.

4. The method of artificially creating a sealed stratum according to claim 1 wherein said stratum comprises a subsurface layer of the earth.

5. The method of artificially creating a sealed stratum according to claim 4 wherein said subsurface layer consists essentially of carbonate rocks.

6. The method of artificially creating a sealed stratum according to claim 5 wherein said carbonate rocks are limestone and/or dolomite.

7. The method of artificially creating a sealed stratum according to claim 6 wherein said aqueous solution comprises a concentrated slurry of at least one of aragonite and vaterite.

8. The method of artificially creating a sealed stratum according to claim 7 and comprising the further step of drilling injection wells, extending from the earth's surface at least substantially to said stratum wherein said area is contacted with said slurry by pumping said slurry into said wells.

9. The method of artificially creating a sealed stratum according to claim 5 wherein said alkaline conditions comprise said carbonate rocks and natural groundwaters therein.

10. The method of artificially creating a sealed stratum according to claim 9 and including the further steps of extracting and chemically analyzing at least one sample of said groundwaters.

11. The method of artificially creating a sealed stratum according to claim 10 wherein said analysis shows said groundwaters to have calcium ions equal to or exceeding carbonate ions ($Ca^{++} \geqq HCO_3^-$) in mol equivalents, and said aqueous solution comprises at least 1 molar concentrated solution of at least one of $NaHCO_3$, $Na_2CO_3$ and $2(NH_4)CO_3$.

12. The method of artificially creating a sealed stratum according to claim 10 wherein said analysis shows said groundwaters to have carbonate ions exceeding calcium ions ($HCO_3^- > Ca^{++}$) in mol equivalents, and said aqueous solution comprises at least a 1 molar concentrated solution of calciumians.

13. The method of artificially creating an essentially hydraulically sealed stratum extending laterally over a preselected area beneath the earth's surface, said method comprising:
   (a) selecting a site at least coextensive with said preselected area having a subsurface stratum of initially fluid-permeable, alkaline materials having natural groundwaters therein;
   (b) extracting at least one sample of said groundwaters, and analyzing said sample to determine at least the carbonate and calcium content and the pH thereof; and
   (c) contacting said area with an aqueous, alkaline solution which combines with said groundwaters to produce precipitated calcite within said stratum to an extent rendering said alkaline materials substantially fluid-impervious.

14. The method of claim 13 wherein said aqueous solution is produced from a dry, alkaline material applied to the earth's surface directly above said area, and rain or other natural recharge water leaching said alkaline material into said stratum.

15. The method of claim 14 wherein said aqueous solution is applied to the earth's surface directly above said area to flow downwardly and combine with said groundwaters in said stratum.

16. The method of claim 13 and comprising the further step of drilling at least one injection well extending from the earth's surface at least substantially to said stratum, and wherein said aqueous solution is pumped into said injection well.

17. The method of claim 16 wherein said aqueous solution comprises a highly concentrated slurry of at least two of calcite, aragonite and vaterite.

18. The method of claim 13 wherein said aqueous solution has a pH sufficiently higher than that of said groundwaters that the combination of said solution and said groundwaters has a pH sufficiently high to produce said calcite precipitation.

19. The method of artificially creating an essentially liquid-impervious seal under alkaline conditions of a solid layer of material initially having cracks or voids which render said layer liquid pervious, said method comprising:
   (a) preparing an aqueous solution including dissolved carbon dioxide wherein the pH of said solution increases sufficiently upon degassing to become alkaline and cause precipitation of calcium carbonate from said solution;
   (b) contacting said solid layer with said solution under conditions permitting said carbon dioxide to esolve from said solution, whereby calcium carbonate precipitates from said solution; and
   (c) continuing said contact until the amount of precipitated calcium carbonate is sufficient to essentially fill said cracks or voids and render said layer substantially liquid impervious.

20. The method of claim 19 wherein said calcium carbonate is calcite.

21. The method of claim 20 wherein said layer is a subsurface earth stratum above the water table.

22. The method of claim 20 wherein said layer is a subsurface earth stratum below the water table, and including the further steps of extracting chemically analyzing a sample of the groundwater prior to preparing said solution.

* * * * *